May 8, 1956
B. REYNOLDS
2,744,506
TWO-STROKE UNIFLOW-SCAVENGED INTERNAL COMBUSTION ENGINE
Filed May 19, 1953
3 Sheets-Sheet 1
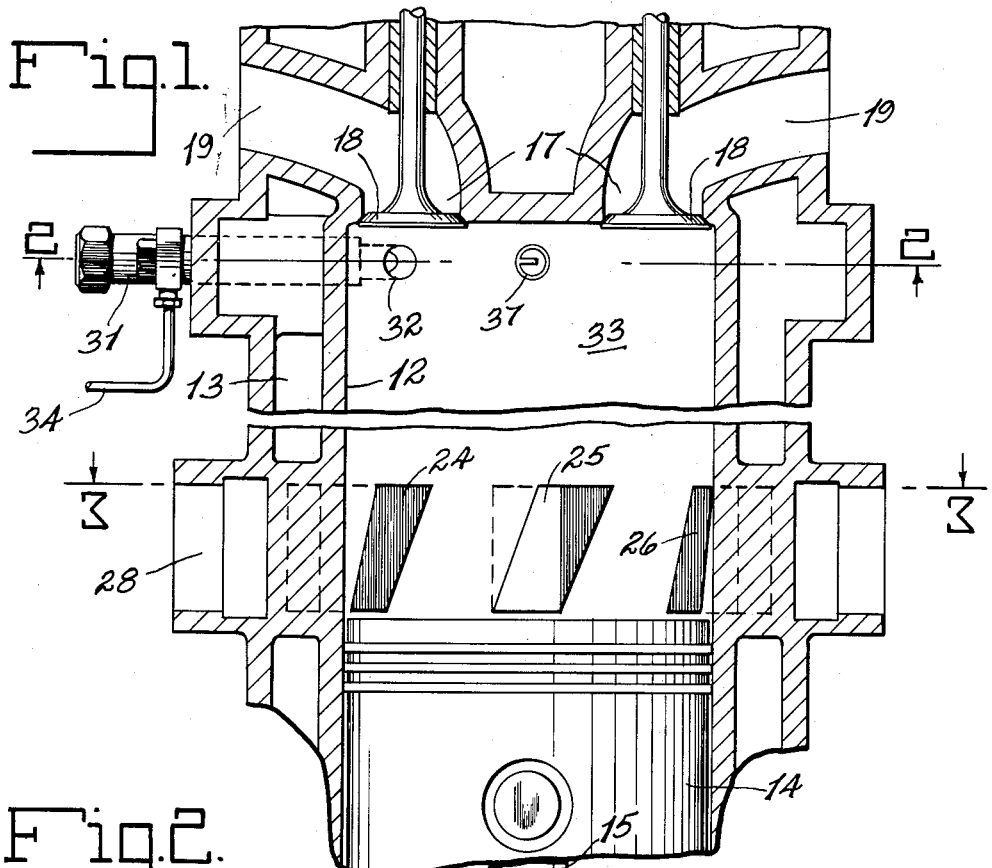
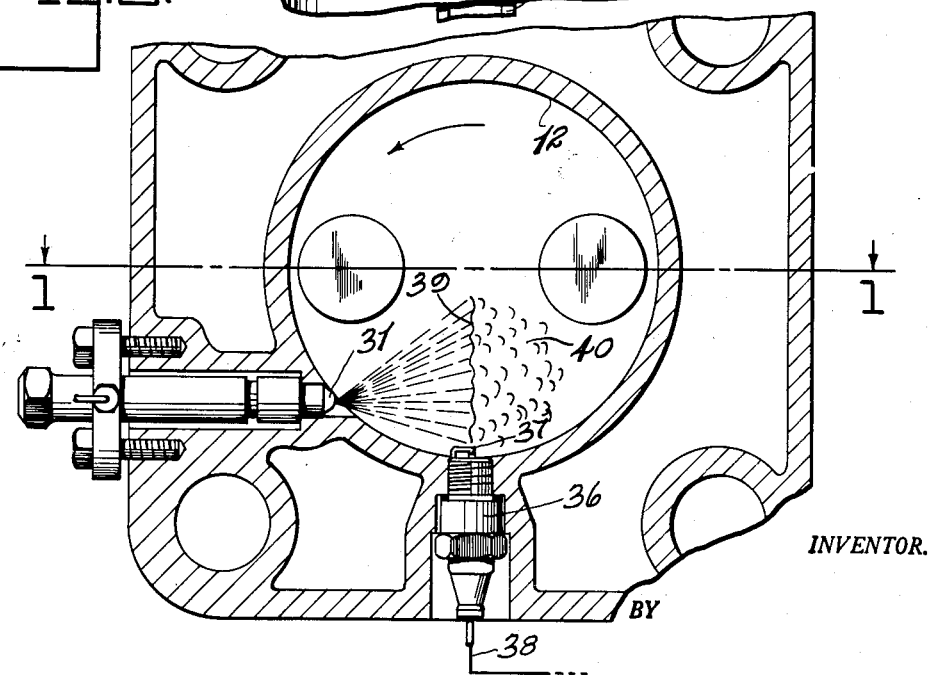
INVENTOR.
BY

INVENTOR.

BY

United States Patent Office 2,744,506
Patented May 8, 1956

2,744,506

TWO-STROKE UNIFLOW-SCAVENGED INTERNAL COMBUSTION ENGINE

Blake Reynolds, Riverside, Conn., assignor to Texaco Development Corporation, New York, N. Y., a corporation of Delaware Application May 19, 1953, Serial No. 356,025

2 Claims. (Cl. 123—32)

This invention relates to two-stroke cycle internal combustion engines. More particularly it relates to such engines of the uniflow-scavenged type, and operating with combustion of the cushioned or non-knocking type, as described in copending application Serial No. 284,075, filed April 24, 1952, now Patent No. 2,691,968, issued October 19, 1954.

In engine operation of the type with which the present invention is concerned, as described in copending application S. N. 284,075, an air charge is inducted and caused to form a compressed rapidly swirling mass in the engine cylinder. The fuel (say gasoline, kerosene, diesel fuel, or even a heavier hydrocarbon mixture) is injected into the compressed swirling mass of air during each cycle, in coordination with the weight and rate of swirl of the air, so as to impregnate a localized segment of the swirling mass in a controlled uniform manner at a predetermined fuel-air ratio, thus forming a combustible "patch" of fuel-air mixture. The first increment of this patch is positively ignited substantially as soon as it is formed.

In this way a flame front is formed at the patch. This flame front tends to travel in a direction opposite to the air swirl direction, toward the locus of fuel injection. The resulting combustion products rotate in the direction of the air swirl, away from the flame front, and the flame front is fed with fresh combustible mixture swirling toward it and formed of successive increments of fuel which are synchronously injected into successive increments of the swirling air in a carefully coordinated manner to provide clean efficient combustion at the desired fuel-air ratio. Successive increments of combustible mixture are thus fed to the flame front and burned substantially as fast as they are formed during each combustion period of the engine. Injection of fuel ceases when sufficient fuel-air mixture has been formed in this manner and burned to develop the power required.

The combustible "patch" is confined on one side by an incombustible layer of the combustion products and on its other side by an incombustible layer of air containing little or no vaporized fuel, so that it is incombustible. Combustion is thus confined to and completed in the patch. Under optimum operating conditions substantially no "end gases" are formed, and in any case, "end gases" if they are formed are not exposed to the pressure and temperature for the time required to bring about spontaneous ignition. In consequence, knock is inhibited even at high compression ratios, much above those that may be tolerated even with fuels of high anti-knock value in conventional Otto-cycle engines.

Patent 2,691,968 discloses the above combustion process in two-stroke cycle engine operation. In that application is also disclosed a two-stroke engine of the uniflow-scavenged type, especially constructed and arranged for operation with combustion as above described. The present invention relates to another two-stroke cycle engine of the uniflow-scavenged type which is particularly designed for operation with combustion as above described, and embodies certain features which afford a substantial improvement in operation over the prior art.

In two-stroke engines employing uniflow scavenging, the exhaust port or ports are provided at one end of the cylinder, generally in the cylinder head, and the intake ports are provided in the cylinder wall at or near piston bottom dead center. With this arrangement when the intake ports are uncovered by the descending piston the fresh charge rushes in and displaces the waste combustion products in a unitary direction, axially of the cylinder, upward and out the exhaust ports.

In the uniflow-scavenged engine disclosed in Patent 2,691,968, the required air swirl is produced by arranging the intake ports in the cylinder wall so that the flow axis of each port is disposed tangent to an inscribed circle concentric with the cylinder axis, and having a radius which is of the order of 85% of the cylinder radius.

Such an arrangement is intended to introduce air into the cylinder so that the air mass swirls around the cylinder in the manner of the rotation of a solid body, i. e. every element of the air charge rotates about the combustion chamber axis with the same angular velocity regardless of its radius from the axis of rotation. The reason solid body rotation is desired in engine operation with combustion in the manner above described is that the combustion process depends for its proper and efficient operation on uniform impregnation of the air charge in an orderly manner, coordinated with weight and swirl rate of the air, to attain a controlled fuel-air ratio in each increment of mixture formed. Any deviation from the desired constant angular velocity rotation about the combustion chamber axis may therefore be seen to interfere with orderly and uniform fuel impregnation of the air, and hence detracts from the combustion efficiency.

Cylinder wall intake ports which are tangentially inclined, such as those of the engines disclosed in application S. N. 284,075, do afford rotation of the air charge which approximates solid body rotation. It has been found, however, that in engine operation as above described with intake ports so arranged, a vortex is created in the swirl of the air charge, causing unequal angular velocities of the air at different radii from the axis of rotation, and interfering with uniform impregnation of the air charge at a controlled fuel-air ratio.

With that port arrangement it has also been found that, during the induction of the fresh air charge and displacement by it of waste combustion products, the axial flow velocity of the air at the periphery of the cylinder greatly exceeds the axial velocity of air flowing along the central core of the cylinder. This wide variation in axial flow velocity through the cylinder during the scavenging operation permits some of the fresh air charge flowing up the cylinder wall to reach the exhaust ports and escape therefrom before much of the waste combustion product in the central core of the cylinder has been displaced out the exhaust ports, thus decreasing scavenging efficiency. And, after the ports close, the decrease of average axial flow velocity to zero causes a toroidal motion of the air to be set up during the compression stroke of the piston, with the upward velocity at the cylinder periphery being matched by downward velocity in the cylinder core. This toroidal motion severely disrupts the desired solid body rotation of the inducted air, interfering with its uniform impregnation with fuel at a controlled fuel-air ratio, and thus decreasing combustion efficiency, lowering power output, and increasing fuel consumption.

The present invention provides an improved uniflow-scavenged, two-stroke engine for operation with controlled combustion of the non-knocking type as above described, which enables induction of fresh air and scavenging of waste combustion products with a more uniform axial velocity, and rotation of the fresh air charge with a more uniform angular velocity, thereby substantially improving scavenging efficiency, reducing undesired air turbulence, and permitting a more uniform impregnation of the air charge with fuel at a controlled fuel-air ratio.

It is an object of the present invention therefore to provide an improved two-stroke internal combustion engine for operation with swirling of the air charge and non-knocking combustion.

Another object is to provide a uniflow-scavenged two-stroke internal combustion engine of this character having an air induction system arranged to provide rotation of the air charge about the cylinder axis with an improved degree of uniformity during the fuel injection period for patch impregnation at a controlled fuel-air ratio.

Another object is to provide a uniflow-scavenged two-stroke internal combustion engine of this character having an air induction system arranged to provide rotation of the air charge about the cylinder axis with decreased turbulence during the fuel injection period for patch impregnation at a controlled fuel-air ratio.

Another object is to provide a uniflow-scavenged two-stroke internal combustion engine of this character having an air induction system arranged to provide rotation of the air charge about the cylinder axis with more uniform angular velocity during the fuel injection period for patch impregnation at a controlled fuel-air ratio.

Another object is to provide a uniflow-scavenged two-stroke engine of this character providing a more uniform axial flow velocity of the fresh charge within the cylinder during the scavenging period, with reduced toroidal air motion after the scavenging period and during the fuel injection period for patch impregnation at a controlled fuel-air ratio.

Another object is to provide an improved uniflow-scavenged two-stroke engine employing combustion in the manner hereinbefore described and provided with an air induction system having a portion for creating rotation of the air charge and having another portion for preventing vortex formation and equalizing angular velocity of rotation of the charge, and for equalizing the axial flow velocity of the charge in the cylinder.

Another object is to improve the combustion efficiency of a two-stroke engine operating with combustion in the manner hereinbefore described.

Another object is to improve the scavenging efficiency as an incident to improving the combustion efficiency of a two-stroke engine operating with combustion in the manner hereinbefore described.

These and other objects and advantages of the invention will be apparent from the following description taken in conjunction with the accompanying drawing wherein:

Fig. 1 is a partial vertical sectional view taken along line 1—1 of Fig. 2 of a two-stroke cycle engine constructed in accordance with the present invention.

Fig. 2 is a horizontal sectional view taken along line 2—2 of Fig. 1.

Figure 3:
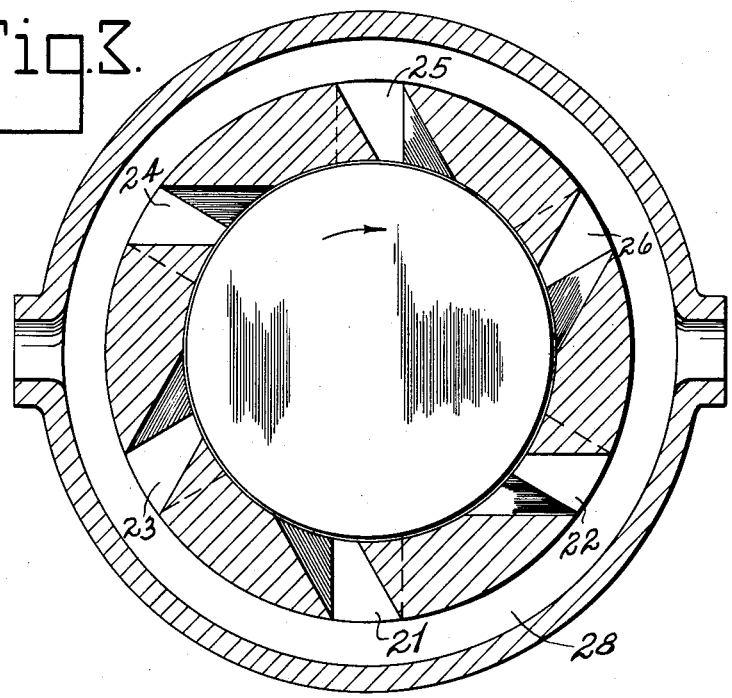
Fig. 3 is a horizontal sectional view taken along line 3—3 of Fig. 1, showing one embodiment of an air intake port arrangement for an engine constructed in accordance with the present invention.

Referring to Figs. 1 and 2, the engine comprises a cylinder 12 having a cooling jacket 13, a piston 14 and a connecting rod 15 which runs to the usual crank shaft (not shown). The cylinder is equipped with two exhaust ports 17 controlled by a pair of poppet valves 18 operated from the engine crank shaft through a cam shaft and tappet drive (not shown) in conventional manner. The exhaust ports 17 open into exhaust passages 19 leading to a common exhaust manifold. The cylinder 12 is provided with a circumferential series of slot-like air intake ports 21, 22, 23, 24, 25, 26, extending through the cylinder wall and communicating with an intake manifold 28. The ports 21, 22, etc. are identical in shape, and are located adjacent the opposite end of the cylinder from the exhaust ports 17 and slightly above the bottom dead center position of the piston. These ports 21, 22, etc. and their manner of operation during the combustion cycle of the engine will be described more fully hereinafter.

Reciprocation of the piston 14 controls the opening and closing of the air intake ports 21, 22, etc. while a cam and tappet drive controls the exhaust ports 17, thereby rendering the timing of the exhaust and intake ports independent of each other but synchronized with engine operation.

A fuel injection nozzle 31 extends through a suitable opening 32 in the cylinder wall and is directed to discharge a cone-shaped spray into one side of the disc-shaped combustion space 33 in the direction of air swirl so as to uniformly impregnate a localized segment of the swirling air mass across a radius of the combustion space 33 at a desired fuel-air weight ratio. Fuel is supplied to nozzle 31 through piping 34, at controlled periods in the engine cycle, by a suitable fuel pump driven by the engine in conventional manner.

A spark plug 36 is mounted in the cylinder wall with its electrodes 37 positioned close to the periphery of the combustion space 33. The spark plug is connected by a lead 38 to a conventional ignition circuit which is actuated in synchronization with the engine to produce a spark at the electrodes 37 at the time when the first increment of injected fuel from nozzle 31 has formed combustible fuel vapor-air mixture, and is susceptible to ignition. The location of the plug 36 is correlated with the location of the nozzle 31 and the velocity of rotation of the swirling air charge so as to be within the region of the impregnated localized segment where combustible fuel vapor-air mixture is first formed.

It will be understood that in the operation of the engine, combustion in the manner heretofore described is that of a combustible mixture consumed at a single flame front 39, and is distinct from the heterogeneous burning at a plurality of dispersed fuel turbulences which characterize diesel combustion. However, instead of the combustion space 33 being filled or substantially filled with preformed combustible mixture at the time of ignition, with the resulting flame front traveling outward from the point of ignition in a generally spherical pattern through the combustible mixture as in conventional Otto cycle operation, there is only the small localized segment opposite the plug 36 at the time of ignition.

The flame front thus spreads across this combustible segment and travels counter to the direction of air swirl through succeeding portions of combustible mixture formed immediately in advance of the flame front as injection continues. The first formed products of combustion, indicated at 40, rotate with the swirling mass away from the flame front 39 as freshly impregnated compressed air rotates toward the flame front. The established flame front 39 tends to travel toward the nozzle 31, but this movement is impeded by the swirling movement of the air and by the fact that the localized impregnated segment closer to the nozzle is incombustibly rich. The net result is that flame front 39 remains comparatively fixed with respect to the cylinder wall, fuel nozzle 31 and spark plug 36 although it is traveling through a thin layer of combustible mixture formed immediately in advance of the flame front.

Figure 4:
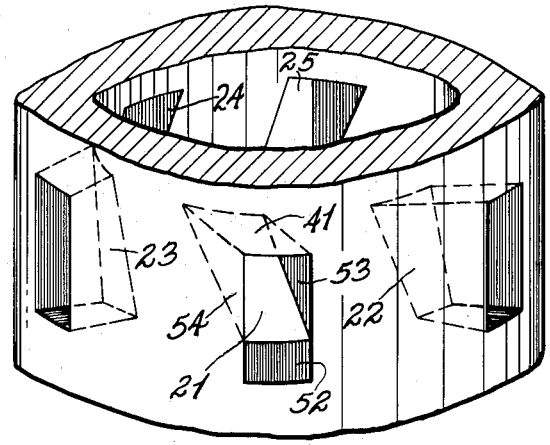
Fig. 4 is a perspective view of the portion of the cylinder wall shown in horizontal view in Fig. 3.

Since all of the intake ports 21, 22, 23, 34, 25, 26 are identical, the details of each will now be described in connection with port 21. In accordance with the present invention, and as shown particularly in Fig. 4, the intake port 21 is twisted or warped, so that its top or upper face 41 is tangentially inclined relative to an inscribed circle concentric with the axis of cylinder 12. The bottom or lower face 52 of port 21 is, however, disposed radially of the cylinder, i. e. so as to be bisected by a cylinder radius. Horizontal sections through the port 21 are tangentially inclined to a progressively greater degree from the lower to the upper face, and the side walls 53 and 54 of the port, while substantially flat, are slanted accordingly. Thus the air flowing into the cylinder 12 through port 21 is directed so that the part of it flowing through the upper portion of the port swirls rapidly around the periphery of the cylinder, while that portion of it flowing through the lower portion of the port is directed straight into the center of the cylinder 12 without any tangential velocity component.

The effect of a port so shaped and arranged is to place more of the inducted air charge at the center or axis of the cylinder, which prevents a low pressure area from being created there. This in turn prevents the high velocity air swirl from forming a vortex at the cylinder axis, and, by equalizing the axial velocity of air flow in the cylinder during the scavenging operation, prevents the development of toroidal motion of the air charge after completion of scavenging and port closure. This effects a substantial decrease in undesired air turbulence which such vortex and toroidal air flow conditions create, with a resulting improvement in the orderliness and uniformity of angular velocity of the air rotation during fuel impregnation, which enables more positive and accurate control of fuel-air ratio in each increment of impregnated air.

Thus the function of that portion of each of the ports 21, 22, etc., furthest removed from bottom dead center is to create the necessary high velocity air swirl, while the function of that portion of each of the ports closest to bottom dead center is to get air into the central core of the cylinder to prevent vortex formation, equalize axial air flow velocity within the cylinder during the scavenging phase of the combustion cycle and prevent toroidal air flow in the cylinder after scavenging.

Figure 5:
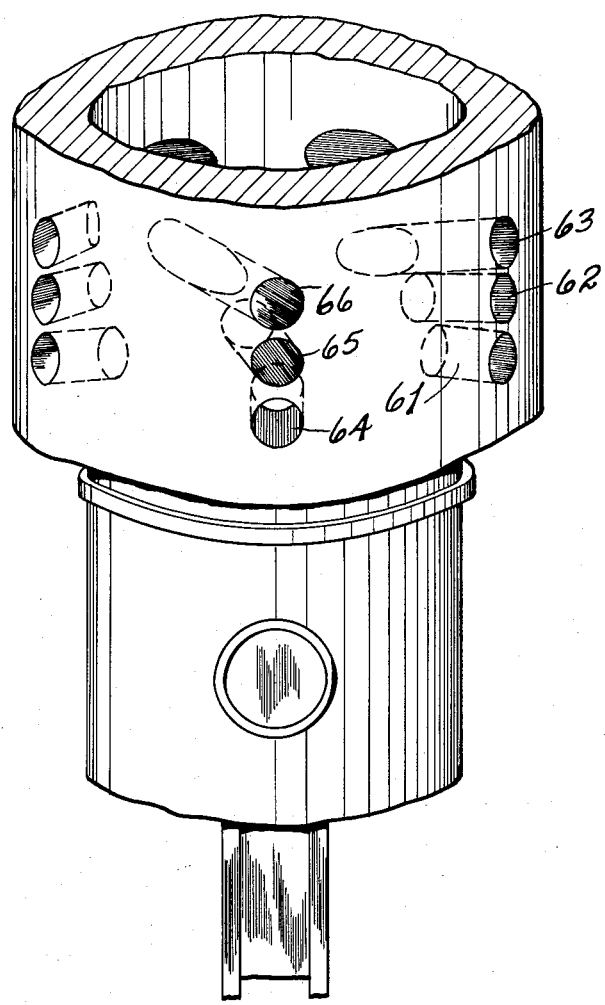
Fig. 5 is a perspective view similar to Fig. 4, showing another intake port arrangement for an engine constructed in accordance with the present invention.

In another species of the present invention, the equivalent of each integral warped or twisted intake port 21, 22, etc., above described may be provided as shown in Fig. 5 in the form of a plurality of smaller individual ports, 61, 62, 63 and 64, 65, 66, etc. With this arrangement the topmost ports, i. e., those furthest from bottom dead center, are tangentially inclined to the greatest degree, and the lowest ports are disposed substantially radially, with their flow axes focused at the cylinder center. It may be seen from Fig. 5 that all of the ports, 61, etc., together form several parallel circumferential layers or rings in the cylinder wall 12 in place of the one ring of warped ports 21, 22, etc. In this arrangement each port 61, etc., is effectively equivalent to an increment of one of the twisted ports 21, etc. The ports 61, 64, etc., in the ring of ports closest to bottom dead center thus function in the same manner as the lowest portion of each integral port 21, 22, etc. to put air into the core of the cylinder. The ports in the rings of ports progressively further from bottom dead center, being tangentially inclined to a progressively greater degree, i. e. tangent to progressively larger inscribed circles in cylinder 12, serve to provide the necessary air swirl.

Thus in the improved uniflow-scavenged two-stroke internal combustion engine of the present invention, controlled combustion in the manner heretofore described is accomplished with induction of fresh air and scavenging of waste combustion products with a more uniform axial velocity, and rotation of the fresh air charge with a more uniform angular velocity, thereby substantially improving scavenging efficiency, reducing undesired air turbulence, and permitting a more uniform impregnation of the air charge with fuel at a controlled fuel-air ratio.

Obviously, many modifications and variations of the invention, as hereinbefore set forth, may be made without departing from the spirit and scope thereof, and therefore only such limitations should be imposed as are indicated in the appended claims.

I claim:

1. In a two-stroke cycle uniflow-scavenged internal combustion engine comprising a cylinder having a reciprocating piston therein, exhaust ports for the cylinder, intake ports in the cylinder for admitting a fresh air charge and displacing waste combustion products through said exhaust ports, each of said intake ports having a flow axis normal to the longitudinal axis of said cylinder and being of generally rectangular cross section and being twisted so that the center line of its top is tangent to an inscribed circle concentric with said cylinder while the center line of its bottom is coincident with a cylinder radius, whereby a portion of the air flowing through each of said ports is caused to swirl rapidly about said cylinder and another portion is caused to fill the central core of said cylinder and equalize axial flow velocity and prevent formation of a vortex and toroidal air motion therein, means for uniformly impregnating with fuel a predetermined portion of the path of the swirling air charge at a controlled rate during the piston compression stroke, and positive ignition means for igniting the first increment of injected fuel substantially as soon as combustible fuel-air mixture is formed therefrom to establish a flame front to burn succeeding increments of injected fuel.

2. A two-cycle internal combustion engine comprising a cylinder enclosed at one end by a cylinder head and having a reciprocating piston therein, exhaust ports in said cylinder head, air induction port means in the cylinder wall adapted to be uncovered by said piston near its bottom dead center position, means for opening said exhaust ports in timed relation with the uncovering of said air induction port means to scavenge the cylinder in a uniflow manner and induct a fresh air charge, at least a portion of said air induction port means being disposed tangentially of said cylinder and at least another portion of said air induction port means being disposed radially of said cylinder, said last mentioned port means having a flow axis normal to the longitudinal axis of said cylinder and being substantially rectangular in cross section, whereby all portions of the inducted fresh charge are swirled rapidly around said cylinder with substantially uniform angular velocity and flow axially toward said cylinder head with substantially uniform linear velocity, injection means for fuel impregnating a first localized portion of the path of said swirling charge at a predetermined rate to form successive increments of fuel-air mixture having a predetermined fuel-air ratio, ignition means in a second localized portion of the path of said swirling air charge, timed means for energizing said ignition means during normal engine operation to ignite the first formed fuel-air mixture increment to produce a flame front for progressively burning subsequent increments of fuel-air mixture substantially as rapidly as formed.

References Cited in the file of this patent

UNITED STATES PATENTS

| | | |
|---|---|---|
| 2,108,576 | Bokemuller | Feb. 15, 1938 |
| 2,186,812 | Zahren | Jan. 9, 1940 |
| 2,195,044 | Zahren | Mar. 26, 1940 |
| 2,216,083 | Leser et al. | Sept. 24, 1940 |
| 2,484,009 | Barber | Oct. 11, 1949 |

FOREIGN PATENTS

| | | |
|---|---|---|
| 184,692 | Switzerland | Sept. 1, 1936 |
| 218,461 | Switzerland | Apr. 1, 1942 |
| 605,611 | Great Britain | July 27, 1948 |